(12) United States Patent
Rosenberg et al.

(10) Patent No.: US 7,114,177 B2
(45) Date of Patent: Sep. 26, 2006

(54) WEB SITE IDENTITY ASSURANCE

(75) Inventors: Jonathan B. Rosenberg, Auburndale, MA (US); John C. Harrison, Portland, OR (US); David L. Remy, West Linn, OR (US); Neal L. Creighton, Jr., Alpharetta, GA (US)

(73) Assignee: GeoTrust, Inc., Portland, OR (US)

( * ) Notice: Subject to any disclaimer, the term of this patent is extended or adjusted under 35 U.S.C. 154(b) by 653 days.

(21) Appl. No.: 10/039,986

(22) Filed: Jan. 4, 2002

(65) Prior Publication Data

US 2003/0023878 A1 Jan. 30, 2003

Related U.S. Application Data

(60) Provisional application No. 60/279,328, filed on Mar. 28, 2001, provisional application No. 60/289,249, filed on May 7, 2001, provisional application No. 60/295,728, filed on Jun. 4, 2001.

(51) Int. Cl.
G06F 7/04 (2006.01)
G06F 17/30 (2006.01)

(52) U.S. Cl. .......................................... 726/4; 715/738
(58) Field of Classification Search .................. 726/4; 715/500, 738
See application file for complete search history.

(56) References Cited

U.S. PATENT DOCUMENTS

| | | | |
|---|---|---|---|
| 5,623,600 A | 4/1997 | Ji et al. |
| 5,630,066 A | 5/1997 | Gosling |
| 5,802,518 A | 9/1998 | Karaev |
| 5,855,020 A | 12/1998 | Kirsch |
| 5,864,667 A | 1/1999 | Barkan |
| 5,867,651 A | 2/1999 | Dan et al. |
| 5,875,440 A | 2/1999 | Cooperman et al. |
| 5,894,554 A | 4/1999 | Lowery |
| 5,895,470 A | 4/1999 | Pirolli et al. |

(Continued)

FOREIGN PATENT DOCUMENTS

GB 2 259 590 3/1993

(Continued)

OTHER PUBLICATIONS

COMODO, "Why strong validation processes for SSL are essential for the preservation of trust in the Internet economy.", 2002 Comodo Group, pp. 1-5.*

(Continued)

*Primary Examiner*—Matthew Smithers
(74) *Attorney, Agent, or Firm*—Wilmer Cutler Pickering Hale and Dorr LLP

(57) ABSTRACT

The present invention is a method and system for providing a user with confirmation of the origin of a Web site and related information including the steps of registering a Web site with an assuring $3^{rd}$ party, saving the registration on a registration server, entering in a database the Web site's Internet domain name and cross-referencing it to the registration data, retrieving the Web site's domain with an Internet browser, and either (1) using a client application tool to call for registration data for the domain name via a secure SSL connection with the registration server, determining if the domain has been registered, and returning and displaying registration data for the domain name as a confirmed identity, or (2) calling a program on the registration server in response to an HTML tag on the domain via a secure SSL connection and passing it the domain name, determining if the domain has been registered, determining if the domain name has been registered, and returning and displaying registration data for the domain name as a confirmed identity.

8 Claims, 10 Drawing Sheets

U.S. PATENT DOCUMENTS

| | | | |
|---|---|---|---|
| 5,896,533 | A | 4/1999 | Ramos et al. |
| 5,903,882 | A | 5/1999 | Asay et al. |
| 5,935,207 | A | 8/1999 | Logue et al. |
| 5,961,591 | A | 10/1999 | Jones et al. |
| 5,982,898 | A | 11/1999 | Hsu et al. |
| 5,983,348 | A | 11/1999 | Ji |
| 6,018,724 | A | 1/2000 | Arent |
| 6,018,801 | A | 1/2000 | Palage et al. |
| 6,026,166 | A | 2/2000 | Lebourgeois |
| 6,035,402 | A | 3/2000 | Vaeth et al. |
| 6,044,462 | A | 3/2000 | Zubeldia et al. |
| 6,058,383 | A | 5/2000 | Narasimhalu et al. |
| 6,065,055 | A | 5/2000 | Hughes et al. |
| 6,131,162 | A | 10/2000 | Yoshiura et al. |
| 6,134,658 | A | 10/2000 | Multerer et al. |
| 6,154,844 | A | 11/2000 | Touboul et al. |
| 6,157,930 | A | 12/2000 | Ballard |
| 6,199,052 | B1 | 3/2001 | Mitty et al. |
| 6,209,029 | B1 | 3/2001 | Epstein et al. |
| 6,226,624 | B1 | 5/2001 | Watson et al. |
| 6,233,618 | B1 | 5/2001 | Shannon |
| 6,236,978 | B1 | 5/2001 | Tuzhilin |
| 6,247,007 | B1 | 6/2001 | Cooperman et al. |
| 6,247,133 | B1 | 6/2001 | Palage et al. |
| 6,275,941 | B1 | 8/2001 | Saito et al. |
| 6,301,658 | B1 | 10/2001 | Koehler |
| 6,327,656 | B1 | 12/2001 | Zabetian |
| 6,351,812 | B1 | 2/2002 | Datar et al. |
| 6,357,010 | B1 | 3/2002 | Viets et al. |
| 6,442,689 | B1 | 8/2002 | Kocher |
| 6,499,105 | B1 | 12/2002 | Yoshiura et al. |
| 6,850,913 | B1* | 2/2005 | Feik ............................ 705/51 |
| 7,003,661 | B1 | 2/2006 | Beattie et al. |
| 2001/0042050 | A1 | 11/2001 | Fletcher et al. |
| 2002/0032665 | A1 | 3/2002 | Creighton et al. |
| 2002/0035686 | A1 | 3/2002 | Creighton et al. |
| 2002/0059364 | A1 | 5/2002 | Coulthad et al. |
| 2002/0112034 | A1 | 8/2002 | Feik |
| 2002/0141592 | A1* | 10/2002 | Aull ........................... 380/282 |
| 2004/0034605 | A1* | 2/2004 | Khaishgi et al. .............. 705/75 |
| 2004/0107363 | A1 | 6/2004 | Monteverde |
| 2005/0166262 | A1 | 7/2005 | Beattie et al. |
| 2006/0015722 | A1 | 1/2006 | Rowan |
| 2006/0053483 | A1 | 3/2006 | Beattie et al. |

FOREIGN PATENT DOCUMENTS

| | | |
|---|---|---|
| GB | 2 308 688 | 7/1997 |
| WO | WO 97/43717 A | 11/1997 |
| WO | WO 97/50036 | 12/1997 |
| WO | WO 99/30218 | 6/1999 |
| WO | WO 00/46681 | 8/2000 |
| WO | WO 02/06932 | 1/2002 |
| WO | WO 02/07377 | 1/2002 |
| WO | WO 02/073364 | 9/2002 |
| WO | WO 02/077793 | 10/2002 |
| WO | WO 02/077831 | 10/2002 |
| WO | WO 02/078259 | 10/2002 |
| WO | WO 02/082716 | 10/2002 |
| WO | WO 03/032572 | 4/2003 |

OTHER PUBLICATIONS

Rosenberg, Jothy , "Helping on-line companies create trusted brands so their site vistors feel confident enough to stay and pay.", Nov. 2001, GeoTrust, pp. 1-11.*
Verisign White paper, "Verisign Business Authentication Service.", 2006, Verisign, pp. 1-18.*
Whir News, "Comodo Unveils Internet Identity Assurance Services.", Jul. 2002, Web Host Industry Review, pp. 1.*
U.S. Appl. No. 09/311,607, filed May 1999, Coulthad et al.
U.S. Appl. No. 09/661,873, filed Sep. 2000, McLeod et al.
U.S. Appl. No. 10/471,701, Rosenberg et al.
U.S. Appl. No. 09/312,751, filed May 1999, Coulthad et al.
Anonymous, Internet, "BYU's Web Filter Keeps Smut Away from Student," Cancereweekly Plus, Apr. 1997, pp. 12-13.
Dean, D., et al., Java Security: From Hotjava to Netscape and Beyond, Proceedings of the 1996 IEEE Symposium on Security and Privacy, Oakland, CA, May 8, 1996.
Gornstein, L., "Bill May Link Cyber Filters, School Funds/LEGISLATION: The law would require that devices be installed on student computers," Orange County Register, Feb. 1998, pp. 1-2.
Anonymous, Merriam-Webster's Collegiate Dictionary, Merriam-Webster, Incorporated, Tenth Edition, 2001, p. 1372.
Press, J., "Secure Transfer of Identity and Privilege Attributes in an Open Systems Environment," Computers 7 Security, International Journal Devoted to the Study of the Technical and Financial Aspects of Computer Security, Apr. 1, 1991, pp. 117-127, vol. 10, No. 2, Elsevier Science Publishers, Amsterdam.
Lopez, J., et al., "An User Authentication infrastructure for Extranet Applications," Proceedings 33rd Annual 1999, International Camahan Conference on Security Technology, Madrid, Spain, Oct. 5-7, 1999, IEEE International Camahan Conference on Security Technology, IEEe, US, Oct. 5, 1999, pp. 354-362, vol. Conf. 33, New York, NY.
Hamilton, M.A., Java and Shift to Net-Centric Computing, Computer, vol. 29, No. 8, Aug. 1996, pp. 31-39.
Chu, et al., "PICS Signaled Labels (Dsig) 1.0 Specification," www.w3.org.TR/REC-Dsig.label/, May 1998.
Spinellis, D., "Trusted Third Party Services for Deploying Secure Telemedical Applications over the WWW," Computer & Security, International Journal Devoted to the Study of the Technical and Financial Aspects of Computer Security, 1999, pp. 627-639, vol. 18, No. 7, Elsevier Science Publishers, Amsterdam.

* cited by examiner

WEB SITE IDENTITY ASSURANCE

RELATED APPLICATIONS AND CLAIM OF PRIORITY

This application claims the benefit of and incorporates herein by reference the contents of the following co-pending applications: Application No. 60/279,328 filed Mar. 28, 2001, entitled "Website Identity Assurance"; Application No. 60/289,249 filed on May 7, 2001, entitled "TrustWatch"; and Application No. 60/295,728 filed on Jun. 4, 2001, entitled "TrustWatch True Site".

BACKGROUND OF THE INVENTION

This invention relates to electronic communication systems and in particular to a method and apparatus for showing end-users the confirmed identity of a Web site owner, and also in particular to this method and apparatus being a secure and reliable reporting mechanism based on existing and prevalent common standards.

The importance of secure communication is increasing as world-wide networks such as the Internet and the World Wide Web (WWW) portion of the Internet expand. As global networks expand through the interconnection of existing networks, users may gain access to an unprecedented number of services. The services, each of which may be maintained by a different provider, give users access to academic, business, consumer, and government information. Service providers are now able to make their services available to an ever-expanding user base that is truly global.

The ease with which services and users are able to find each other and the convenience associated with on-line transactions is leading to an increase in the number of remote business and related transactions. However, users and services are not always certain who or what is at the other end of a transaction. Therefore, before they engage in business and other transactions, users and services want and need reassurance that each entity with whom they communicate is who or what it purports to be. For example, users will not be willing to make on-line purchases that require them to reveal their credit card numbers unless they are confident that the service with which they are communicating is in fact the service they wanted to access. Commercial and other private entities who provide on-line services may be more reluctant than individuals to conduct business on-line unless they are confident the communication is with the desired individual or service. From the small and/or new on-line merchant's standpoint, they can reach a global audience through the World Wide Web but they are usually unknown to potential customers and have no brand on which to build an on-line business. For them, displaying confirmed and trusted identity and legitimacy are critical to building their brand and business.

Both users and services need reassurance that neither will compromise the integrity of the other nor that confidential information will be revealed unintentionally to third parties while communications are occurring. Security in a global network, however, may be difficult to achieve for several reasons. First, the connections between remote users and services are dynamic. With the use of portable devices, users may change their remote physical locations frequently. The individual networks that comprise the global networks have many entry and exit points. Also, packet switching techniques used in global networks result in numerous dynamic paths that are established between participating entities in order to achieve reliable communication between two parties. Finally, communication is often accomplished via inherently insecure facilities such as the public telephone network and many private communication facilities. Secure communication is difficult to achieve in such distributed environments because security breaches may occur at the remote user's site, at the service computer site, or along the communication link. Consequently, reliable two-way authentication of users and the services is essential for achieving security in a distributed environment.

Website Identity and SSL Protocol

The problem of establishing the identity of the owner and responsible party for a Web site is partially remedied by protocols such as the Secure Sockets Layer (SSL) protocol.

In the SSL protocol, each communicating program is assigned a key pair consisting of a public cryptographic key and a private cryptographic key. SSL uses the public and private keys for two programs to generate an agreed key that is used to encrypt a conversation between the two programs. This ensures privacy for the conversation and provides assurance to each party that only the other party could generate the other half of the conversation (this property is called two-party authentication).

In these prior art systems, a program that needs to send securely a non-repudiable piece of information (such as a receipt or a signed check) does so by encrypting that piece of information with its private key, which is equivalent to a digital signature. This technique is called signing. The receiver of the signed message can prove that the encrypted information came from the supposed sender (or anyone who knows the sender's private key) by successfully decrypting the message using the sender's public key. The receiver could also forward the message to a third party, who could similarly verify the sender's identity. Thus, non-repudiation is provided for specific situations.

SSL protocol, therefore, provides a partial identification and authentication solution for Web sites. There are limitations, however, as discussed below.

Limitations of SSL Protocol for Identification and Authentication

Even when a Web site is operating in SSL mode, the identity information stored in the underlying SSL certificate is not easily accessible to an end user for authentication purposes. Further, end users browsing the Web need to be able to know who is behind a site whether in SSL mode or not. Only a small percentage (less than 1%) of Web sites use SSL, and at those sites, only a small percentage (e.g., 1%) of all pages are protected by SSL.

In the SSL process the identity of the business responsible for a Web site is established and tied to Web site (actually to the fully qualified domain name) by a trusted certificate authority. This identity, when running under SSL mode, is available in a hidden way by clicking on the lock icon in the browser. However, most users do not know this lock icon is active elements that can be clicked and further do not understand the detailed information provided if they do click on it.

While SSL does a good job at establishing the basis for identity it has three chief shortcomings: (1) It does not work for pages that are not running under SSL (approximately 99.99% of all Web pages), (2) the identity aspect of SSL is hidden and obscure to the user, and (3) the limited identity information is minimal, incomplete and not considered useful to a consumer.

Furthermore, while SSL inherently supports identity and encryption, it is primarily focused on encryption. Use of SSL incurs substantial overhead (at least a 35% performance penalty and no possibility of pages being cached), and therefore is only present and usable on pages that require encryption such as those gathering sensitive data. A strategy for taking advantage of the identity aspects of SSL without incurring the overhead of encryption is not possible with its current design which is predicated exclusively on encryption of transmitted data.

Non-SSL Web Site Identity Solutions

While Web sites themselves can assert their identity without the use of SSL (e.g., through simple graphics and text), this identity method also has shortcomings: (1) Each Web site asserts its identity in a different way, leaving the user to figure out how to find the identifying information, and (2) no $3^{rd}$ party is standing behind the identity assertions, so a Web site can easily deceive an end user by putting whatever identity it desires on the Web site.

Use of Seals

Another non-SSL mechanism in common use by Web site owners to establish their identity and legitimacy as a reputable on-line business is to place seals from third parties on some of their Web pages. These seals are meant to portray an endorsement of some kind by the trusted, well-known third party seal provider. Seals are common in the off-line world and are displayed on doors and entrances of storefronts, in yellow page ads, on delivery or work vehicles and so on. On the World Wide Web they take the form of a graphic image and usually an active component such as a link that will identify this site as a legitimate holder in good standing of this seal.

Three serious problems exist with this prevalent mechanism. First, users do not usually click on the seal, which is required to verify association with the seal provider. Since the seal is just a static graphic image pulled from a file resident on the site's Web server, all seals from that provider are identical. Therefore the only way to differentiate one seal holder from another and check validity is to click on it. A click usually transfers the user's browser to the seal provider's site where a page is displayed stating the validity or lack thereof for the selected seal. Since most users do not click, this check is rarely performed. Also, users cannot be sure of what the check really is or what is meant to be displayed, so substituting some other page intended to represent or simulate validity (but that is actually fraudulent) is a trivial task for someone wanting to use the seal fraudulently.

The second serious issue is seal copying—the hijacking of the seals and placement on sites that are not legitimately allowed to display them. Any static image viewed by the browser is easily saved to a local disk and can be reused in a new Web page. This copying capability is a fundamental property of standard Web pages and the browsers that view them. This has made fraudulent placement of seals on the Web very common. This fact has made the effectiveness of seals for conveying identity and legitimacy on the Web weak and ineffective.

The third serious issue is Web site spoofing—the wholesale copying of a Web site to a new location for the purposes of identity theft and/or fraud. Site spoofing is a large and growing problem with several very large, public incidents having occurred and with over 1,000 reported incidents a year. Current state-of-the-art seals have no ability to detect site spoofing has occurred. In other words, if a site is spoofed that has one or more of current generation seals on it, the visitor to the spoofed site seeing one of these seals will have no indication this is not the legitimate version of that site.

OBJECT OF THE PRESENT INVENTION

Accordingly, an object of the present invention is to provide the confirmed identity of a Web site owner and related business information, regardless of whether the end user is browsing under SSL (i.e., in https) or not (i.e., in standard http).

It is a further object of the present invention to provide the confirmed identity of the Web site owner and related business information in a standard, recognizable, easy-to-access package passively with no click by the user.

It is a further object of the present invention to provide current confirmation that identity and business information is valid and accurate (e.g., not revoked, not expired).

It is a further object of the present invention to provide an identity confirmation mechanism that is robust and protects itself from copying or site spoofing threats.

SUMMARY OF THE INVENTION

The Web Site Identity Assurance invention described herein provides a confirmed identity and related business information to end users (e.g., browsers). The Identity Assurance is presented to the end user in the form of a visual display on the user's computer desktop or by other means of display or communication. The visual display can be (1) a graphic displayed from a client application tool that an end user would install on his or her machine, (2) a dynamic icon, the code for which is placed on a Web site by the Web site owner, or (3) some other means of display or communication. The client application tool has the ability to watch what sites an end user is browsing and therefore look up the associated confirmed identity information from an independent third party source. The dynamic icon has the ability to cause the browser to look up the associated confirmed identity information from an independent third party source for the URL of the page or pages where the dynamic icon is placed by the Web site owner. All three applications work in both SSL and non-SSL enabled Web sites.

The present invention is a system and method that meets the needs set out above. More particularly, the present invention is a method and system for providing a user with confirmation of the origin of a Web site including the steps of (1) registering a Web site owner's identity and business information with an assuring $3^{rd}$ party, (2) saving the registration in a database on a registration server, (3) entering in the database the Web site's Internet domain, and cross-referencing the Internet domain to the identity and business information), (4) retrieving the Web site's domain with an Internet browser, (5) calling a program at the assuring $3^{rd}$ party's registration server via a secure SSL connection and passing it the Internet domain name, (6) determining if the domain has been registered, (7) retrieving from the repository the identity (e.g., official name) and business information cross-referenced to the Internet domain name and returning the identity and business information to the client tool, (8) displaying the associated identity and business information in the client application tool.

In the alternative, the present invention may include the steps of (1) registering a Web site owner's identity and business information with an assuring $3^{rd}$ party, (2) saving the registration in a database on a registration server, (3) entering in the database the Web site's Internet domain, and cross-referencing the Internet domain to the identity and business information), (4) retrieving the Web site's domain containing an HTML dynamic image tag with an Internet browser, (5) calling a program at the assuring $3^{rd}$ party's registration server via a secure SSL connection and passing it the Internet domain name, (6) determining if the domain has been registered, (7) retrieving from the repository the identity (e.g., official name) and business information cross-referenced to the Internet domain name and generating an image with the identity and business information contained in the image, (8) displaying the dynamic icon image and associated identity and business information on the browser.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

The present invention will now be described in detail with reference to the accompanying drawings. While the present invention is described in the context of an Internet based data communications network, which includes a specific number and type of components, the system of the present invention may be incorporated into data communications networks of many structures and sizes (e.g. mobile networks). The drawings are intended to provide one example of a data communication network configuration in which a system of the present invention may be implemented and are not intended to limit the applicability of the present invention to other network configurations.

The following description of the preferred embodiments of the invention relates to Web pages. It is noted up front, however, that the invention is not limited to use with Web pages.

Rather, all aspects of the invention can be used with any computer generated content including, but not limited to, rows in a database, an entire database, computer generated queries, documents, and the like.

Figure 1:
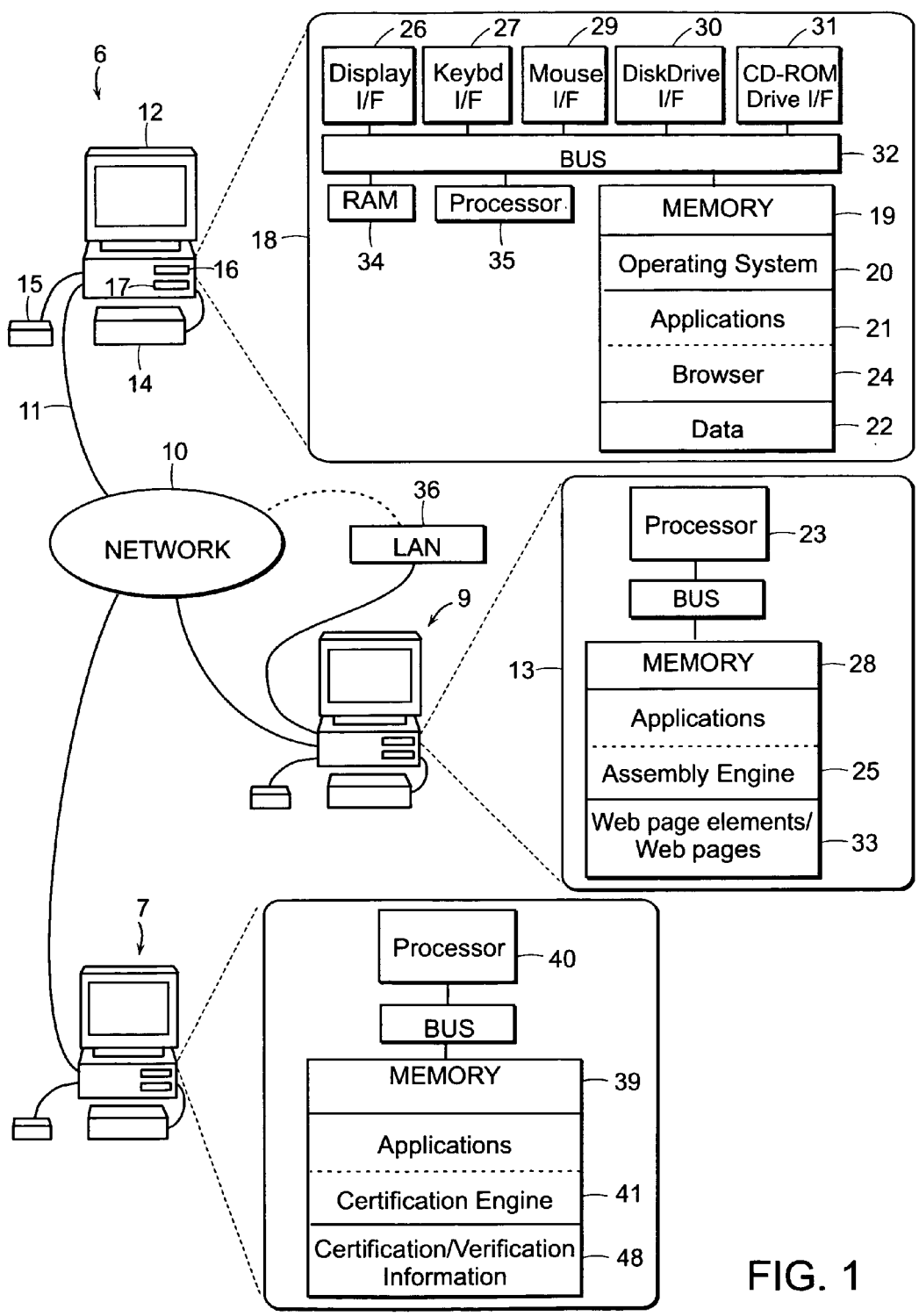
FIG. 1 depicts an exemplary diagram of a network system on which the present invention may be implemented.

The present invention is preferably implemented using a client server architecture, such as that shown in FIG. 1. This architecture includes client 6, certification server 7, and Web server 9 connected via network 10. Network 10 may comprise any type of network or communications medium, including, but not limited to, one or more of the following: the Internet, a local area network ("LAN"), a wide area network ("WAN"), a wireless (e.g., ATM) network, a logical network within a single computer, some other form of programmatic communication such as inter-process communications or dynamic link libraries, or any combination thereof. Client 6 is preferably a personal computer ("PC") or similar data processing device. Client 6 includes network interface 11 for interfacing to network 10, display screen 12 for displaying information to a user, keyboard 14 for inputting text and user commands, mouse 15 for positioning a cursor on display screen 12 and for inputting user commands, disk drive 16 for reading from and writing to floppy disks installed therein, and CD ROM drive 17 for accessing data stored on CD ROM. Close up view 18 shows the internal structure of client 6. Client 6 includes memory 19, which is a computers readable medium, such as a computer hard disk, for storing information. In the preferred embodiment memory 19 stores operating system 20, applications 21, and data 22. Microsoft Windows 2000 is one operating system that may be used with the invention; however, the invention is not limited to use therewith.

Figure 2:
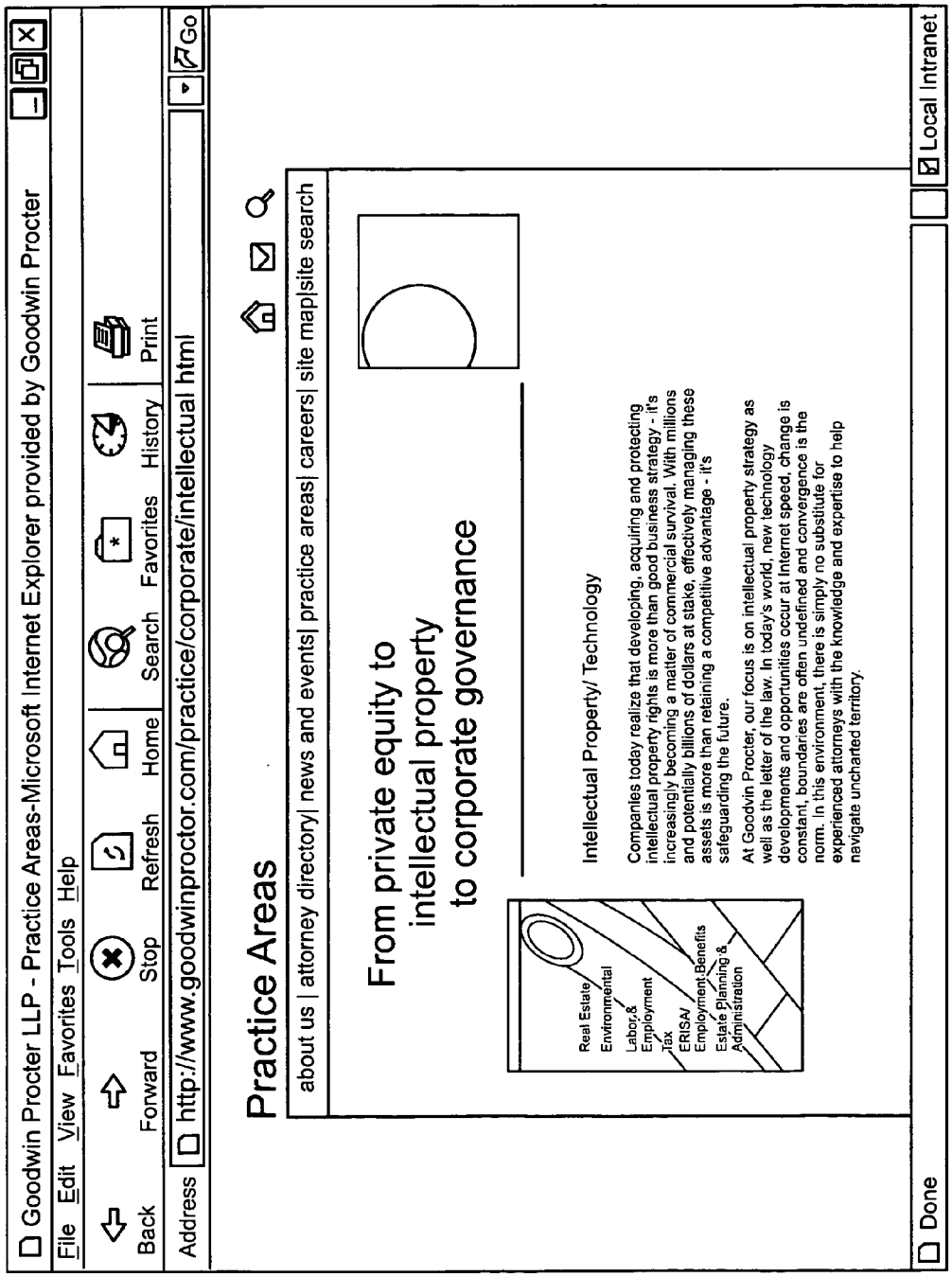
FIG. 2 depicts an exemplary graphical user interface of a Web Browser.

Applications 21 include Web browser 24, among others. An example of a Web browser that may be used with the invention is Netscape™ Navigator Web browser 24 displays a graphical user interface ("GUI") to a user, through which the user may access information via the Internet (e.g., Web sites, individual Web pages, etc.). An example of such a GUI is shown in FIG. 2. Client 6 also includes display interface 26, keyboard interface 27, mouse interface 29, disk drive 20 interface 30, CD ROM drive interface 31, computer bus 32, RAM 34, and processor 35. Processor 35 preferably comprises a microprocessor or the like for executing applications, such as those noted above, out of RAM 34. Such applications, including browser 24, may be stored in memory 19 as noted above or, alternatively, on a floppy disk in disk drive 16 or CD ROM in CD ROM drive 17. In this regard, processor 35 accesses applications and data stored on floppy disk via disk drive interface 30 and accesses applications and data stored on CD ROM via CD ROM interface 31. Web server 9 may comprise a computer having features similar to client 6 for providing remote access to the Web site of an organization. Web server 9 is connected to other computers (not shown) in the organization via LAN 36 (or network 10). Web server 9 is also connected to certification server 7 via network 10 or other medium. Web server likewise includes a processor 23 and a memory 28, among other things, as shown in close up view 13.

Stored in this memory is assembly engine 25 and Web page elements 33. Assembly engine 25 is a program that is executed by processor 23 to assemble Web pages. More specifically, a single Web page may be composed of a plurality of static and dynamic elements, such as images, applets, text, sound, other Web pages, etc. In response to requests received from client 6, assembly engine 25 retrieves those elements (e.g., from memory 28) and combines them in a predetermined manner so as to form the Web page. Representative examples of commercially available assembly engines that may be used in connection with the present invention include ATG Dynamo, Servlets, JSP and ASP Certification server 7 likewise preferably comprises a computer having features similar to client 6. As shown in close up view 38, certification server 7 includes, among other things, memory 39 for storing both applications and certification information 48 which includes the manifests described below. Memory 39 may include one or more memory devices, such as a computer hard disk, redundant array of inexpensive disks ("RAID"), optical disk drive, and the like. Processor 40 is also included on certification server 7 so as to execute applications stored in memory 39 and to provide the resulting output to the network. Among the applications stored in memory 39 is certification engine 41. Certification engine 41 comprises computer executable code that runs on certification server 7 to certify Web pages and other dynamic pages based on their content and/or certification information stored in their elements. Certification engine 41 also organizes sets of Web pages into plural zones based on their levels of certification, the type of information contained therein, or the like, as described in more detail below. It is noted that certification server 7 and Web server 9 may be one in the same; however, since this is not a requirement, the more general case of separate Web and certification servers is depicted in FIG. 1. For that matter, the invention may also be implemented, in its entirety, on a single computer. That is, the functions of client 6, certification server 7 and Web server 9 (or its equivalent) may be implemented on a single computer.

Web Site Identity Assurance

FIGS. 3–10 depict the operation of the Web Site Identity Assurance engine in the context of a particular Web page, although it should be noted that while this embodiment of the invention is described with respect to Web pages, the invention is not limited to use with Web pages and can be used to provide identity assurance of other network data content.

The present invention provides identity assurance of a Web site owner by presenting to the end user in the form of a visual display on the user's computer desktop information regarding the owner. The visual identity display can be either a dynamic icon placed on a Web site by the Web site owner or a graphic displayed from a client application tool that an end user would install on his or her machine. The client application tool has the ability to watch what sites an end user is browsing and therefore look up the associated confirmed identity information.

Figure 3:
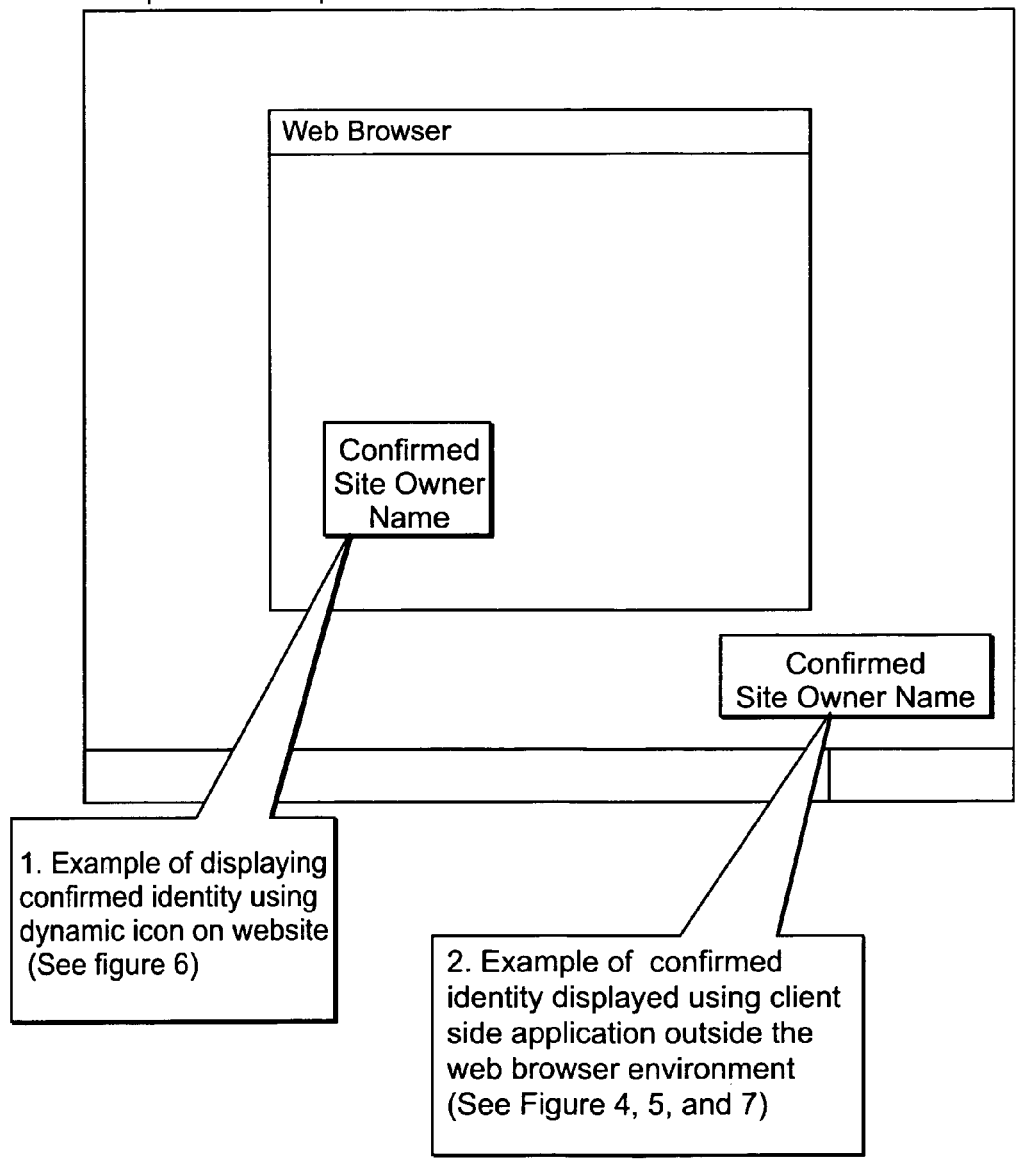
FIG. 3 shows the relationship between a standard Web browser and two embodiments of the invention: the dynamic icon embedded in the HTML page displayed by the browser and the confirmed identity active object (client application tool) running on the end user's local computer.

Turning now to FIG. 3, there is shown a computer desktop having displayed an exemplary Web page having two alternate representations of the visual identity display. The confirmed site owner name can be, as stated above, a dynamic icon displayed on the owner's Web site, or a display generated by a client side application, operating outside the Web browser environment. An end user would install on his or her machine the client side application that has the ability to watch what sites an end user is browsing and therefore look up the associated confirmed identity. The operation of the present invention with respect to either alternate identity display will be described in detail with respect to the following figures.

Client Application Tool Example—Assuring $3^{rd}$ Party Server

Figure 4:
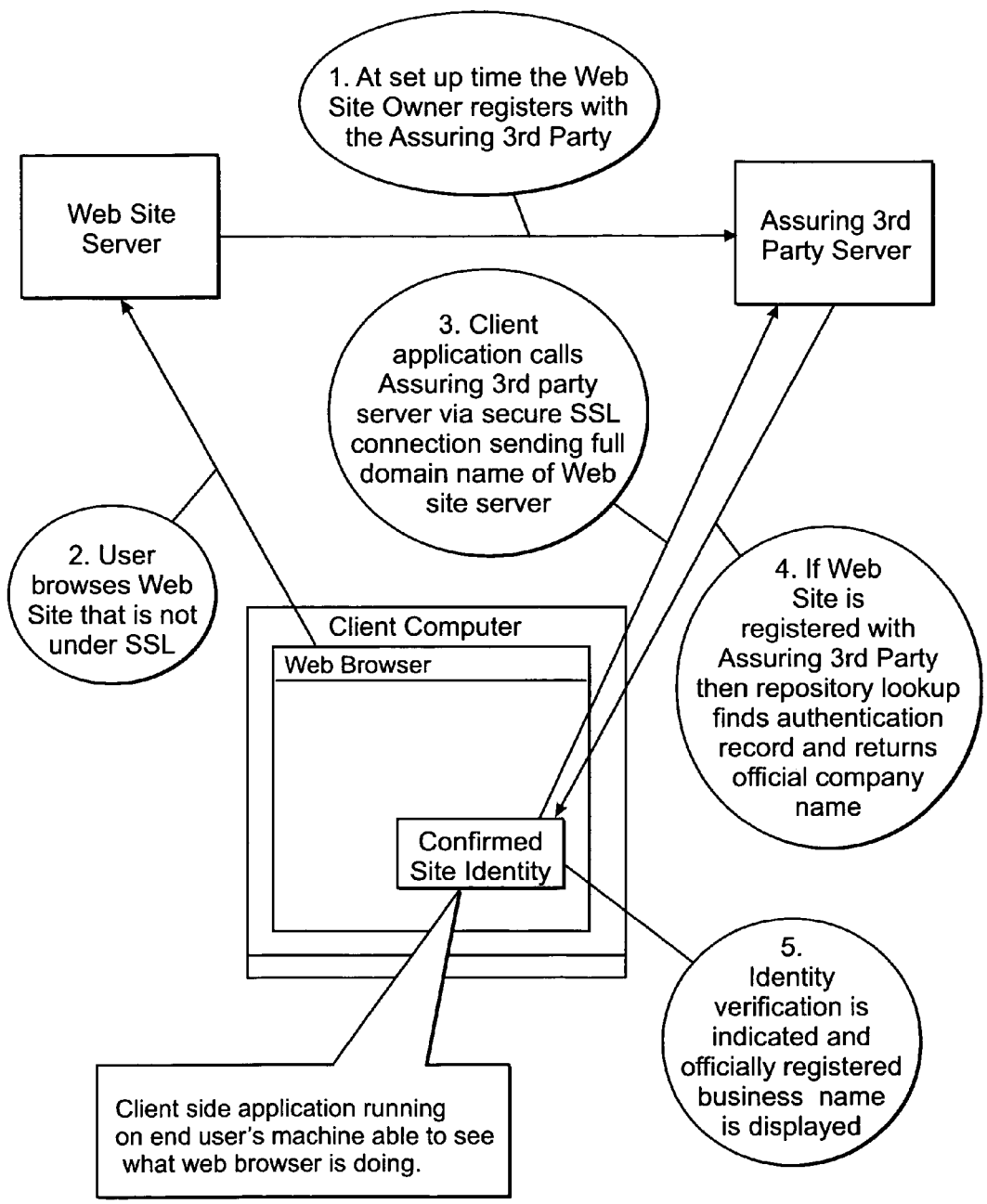
FIG. 4 shows the 3-way architecture of the client-side application component that reliably displays the confirmed identity of the entity behind the displayed Web.

Turning now to FIG. 4, there is shown a block diagram depicting the process steps for implementing this aspect of the present invention. In this aspect, the operation of the Web site identity assurance method utilizes a client side application and an Assuring $3^{rd}$ Party Server. The Web Site Identity Assurance is displayed via a client application tool on the end user's desktop. The client application tool is a tool capable of actively monitoring what the end user is browsing and displaying the confirmed identity of the owner of each and every page browsed at that Web site. The operation of the present invention in this embodiment relies on the Assuring $3^{rd}$ Party Server to provide key information. More specifically the process includes the following steps.

1. At setup time the Web site owner performs an off line registration with an assuring $3^{rd}$ party. The assuring $3^{rd}$ party puts an entry in a database cross-referencing the Web Site's Internet domain to the associated identity and business information provided by the Web site owner during registration. The identity and associated business information is independently confirmed as part of registration. This registration process is a one time event that only occurs at setup time.
2. An end user browses to a Web site that has signed up with the assuring $3^{rd}$ party. The Web site need not be running under SSL. The client application tool running on the end user's system retrieves the current domain being browsed from the client browser itself.
3. The client application tool calls a program via a secure SSL connection on the Assuring $3^{rd}$ Party's Server passing it the domain name being browsed.
4. The Assuring $3^{rd}$ Party Server looks up the domain, determines that it has been registered and returns the associated identity and business information to the client application tool for display.

Client Application Tool Example—Challenge-Response File on Web Site Server

Figure 5:
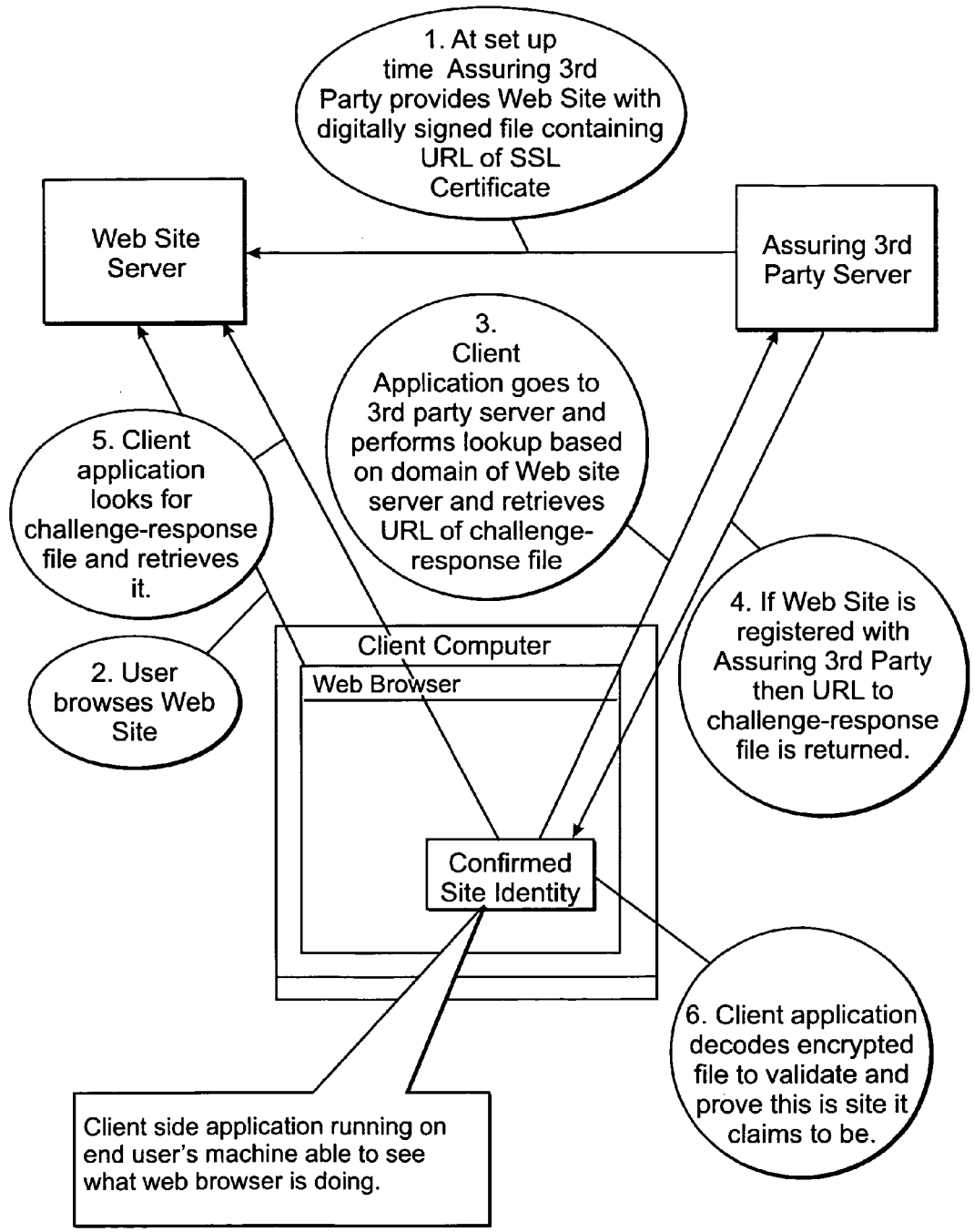
FIG. 5 is a more secure option that adds a challenge-response step between the client side application and the Web server that further assures the end user of the identity of the company behind the server.

Turning now to FIG. 5 there is shown a block diagram depicting the process steps for implementing this aspect of the present invention. In this aspect, the operation of the Web site identity assurance method utilizes an alternative method for displaying to the end user Web Site Identity Assurance using a digitally signed challenge-response file to provide key identity information.

In this alternate version, Web Site Identity Assurance is displayed via a client application tool on the end user's desktop as in the previous exemplary embodiment; however, the identity and business information is stored on the Web site's server rather than the server of the assuring $3^{rd}$ party. As in the previous example, the client application tool is a tool capable of seeing what the end user is browsing and displaying the confirmed identity and business information of the owner of the Web site. In this embodiment of the present invention, the Assuring $3^{rd}$ Party Server provides a digitally signed challenge-response file to the Web Site operator to put on the Web Site's server with a known name, for example Identity.txt and in a known location, typically the root directory. More specifically the process includes the following steps.

1. At setup time the Web Site Owner performs an off-line registration with the assuring $3^{rd}$ party. The assuring $3^{rd}$ party provides the Web site owner with a challenge-response file containing the identity and business information from registration that has been digitally signed by the assuring $3^{rd}$ party. This file is placed in a known location on the Web site server. This registration process is a one time event that only occurs at setup time.

2. The user browses to a Web site that has signed up with the assuring $3^{rd}$ party. The Web site need not be running under SSL. The client application tool running on the end user's system retrieves the current domain being browsed.
3. The client application tool connects to the Web site server looking for the digitally signed file with a known name (for example, Identity.txt) in a known location (typically the root directory).
4. The client application tool validates the digital signature of the assuring $3^{rd}$ party using the embedded $3^{rd}$ party's public key confirming that the file is not invalid and has not been tampered with. Once confirmed, the client application tool displays the identity and business data obtained from the Assuring $3^{rd}$ party server.

Dynamic Icon Example

Figure 6:
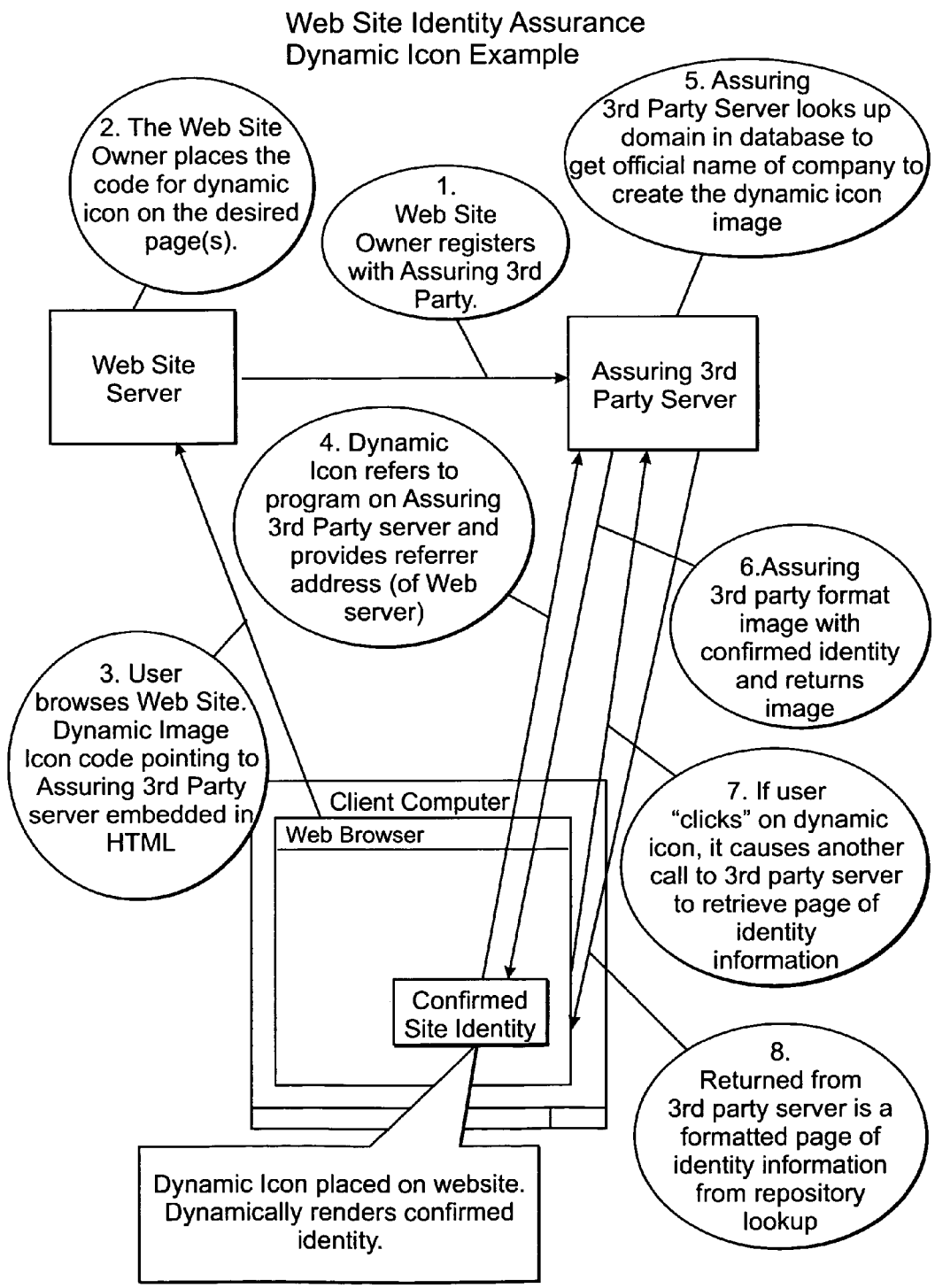
FIG. 6 shows the 3-way architecture behind the dynamic icon on the visited Web site that does a lookup of the visited Web site domain on a Secure Assuring $3^{rd}$ Party Server before the dynamic icon is created and sent from the Secure Assuring $3^{rd}$ Party Server to the visited Web server.

Turning now to FIG. 6 there is shown a block diagram depicting the process steps for implementing this aspect of the present invention. In this aspect, the operation of the Web site identity assurance method utilizes a dynamic icon placed on the Web site by the Web site owner without the need for a client application tool as set forth in the exemplary embodiment of FIGS. 4 and 5. The dynamic icon works similarly to the client application tool; however it is displayed where a Web site owner places it rather than whenever a Web site is browsed to as in the embodiments utilizing a client application tool.

1. At setup time the Web Site Owner performs an off-line registration with the assuring $3^{rd}$ party as previously described.
2. The Web Site Owner places the dynamic icon tag in the desired page(s) on his or her Web Site. The tag is a simple HTML image tag with reference to a remote server not a local static image file as is customary. For example: The image tag might look like <img src=https://www.third-party.com/getImage.jsp>. A very unusual aspect of this is that the image tag points to a program (script) on the Assuring $3^{rd}$ Party's Server rather than to an actual image. This allows the verification program to be invoked and do the assurance process before creating and returning the dynamic image.
3. The user browses to a Web site that has signed up with the assuring $3^{rd}$ party. The dynamic image icon as described above is embedded in the HTML for the Web site. The browser attempting to render the image will invoke the associated program on the Assuring $3^{rd}$ Party's Server by transmitting the Internet domain name for the Web site page being viewed by the browser (Referrer Address).
4. The Assuring $3^{rd}$ Party Server program is invoked via a secure https connection.
5. The Assuring $3^{rd}$ Party Server formats the image with the identity and business information associated with the Referrer Address from the data stored in the Assuring $3^{rd}$ Party Server and adds a date-and-time stamp for copy prevention. The associated program may also return instructions to the browser (e.g., by Java script code) that modifies the behavior of the browser by disabling the right-click or copy function of the end user's mouse so the returned image cannot be copied and pasted at a different Referrer Address (i.e., an anti-fraud and anti-copying feature). This formatted image containing the associated identity and business information is returned to the Web browser and the Web browser renders the image. This embodiment of the present invention makes use of the standard browser feature—that the browser always provides the domain name of the Web site page being viewed by the browser (Referrer Address) at the time it invokes the program associated with the HTML dynamic image tag embedded on the Web site page—as an additional anti-fraud and identity feature, as the Assuring $3^{rd}$ Party Server will only render and return an image to the browser containing the registration data for the Referrer Address, and not for any other address. If the HTML dynamic image icon is somehow copied and pasted or otherwise reproduced on a Web page for another domain name, the program will either return no image or a warning image (if the actual domain name is not registered in the Assuring $3^{rd}$ Party Server) or will return an image containing registration data only for the Web page actually being viewed, not for the Web page from which the HTML dynamic image icon was copied.

SSL Only

Figure 7:
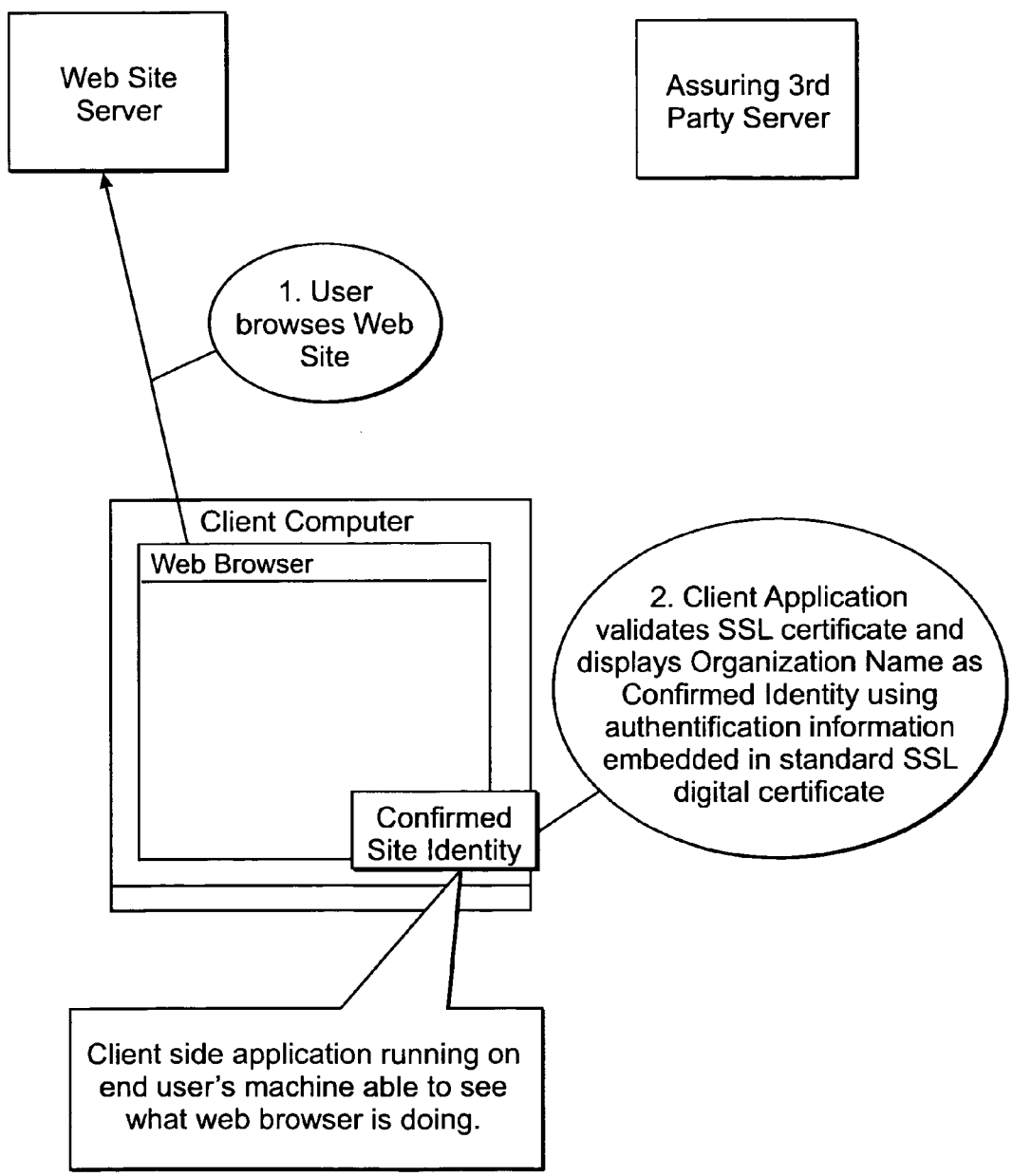
FIG. 7 shows the sequence of logical steps behind the confirmed identity algorithm when the client application tool embodiment is activated on a site that is a secured SSL connection (and without reference to information about the site contained on a secure Assuring $3^{rd}$ Party Server).

Turning now to FIG. 7 there is shown a block diagram depicting the process steps for implementing this aspect of the present invention. In the circumstance that the end user has entered a Web Site under SSL, and therefore it is a simple matter to implement the features of this invention, to display a confirmed identity for the Web site. More specifically the process includes the following steps.

1. The end user browses to a Web site in SSL mode (https).
2. The client application tool recognizes that the browser is in SSL mode, validates the SSL certificate and displays the Organization Name and other embedded information from the certificate.

Visual Identity Assurance Display

Figure 8:
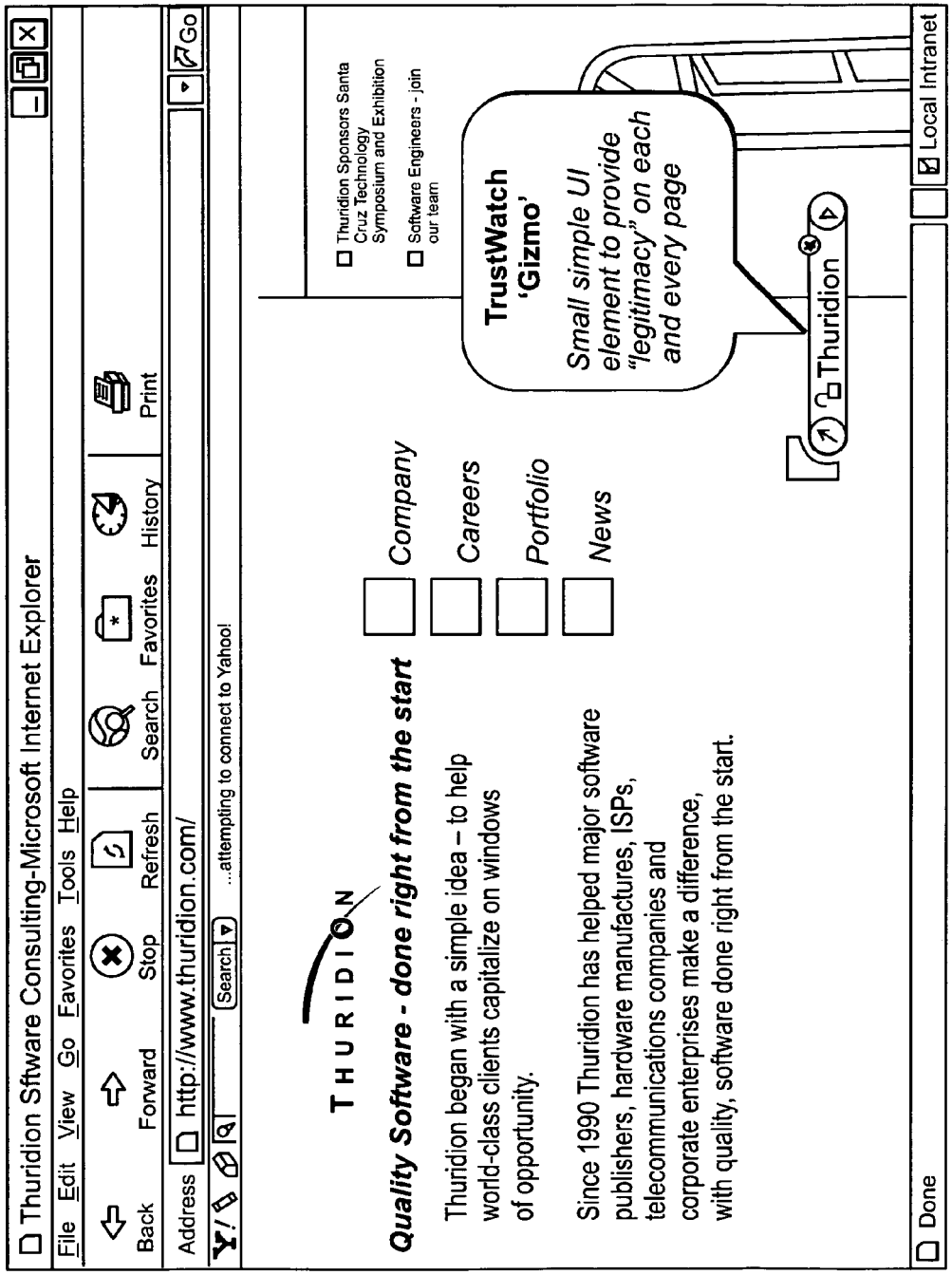
FIG. 8 depicts an exemplary Web page display incorporating the visual identity assurance display icon of the present invention.

Turning now to FIG. 8, there is shown an exemplary Web page display incorporating the visual identity assurance display icon. While this feature will be described as being implemented by the client application tool, the features of the visual display described herein are valid to the dynamic icon embodiment as well.

Figure 9:
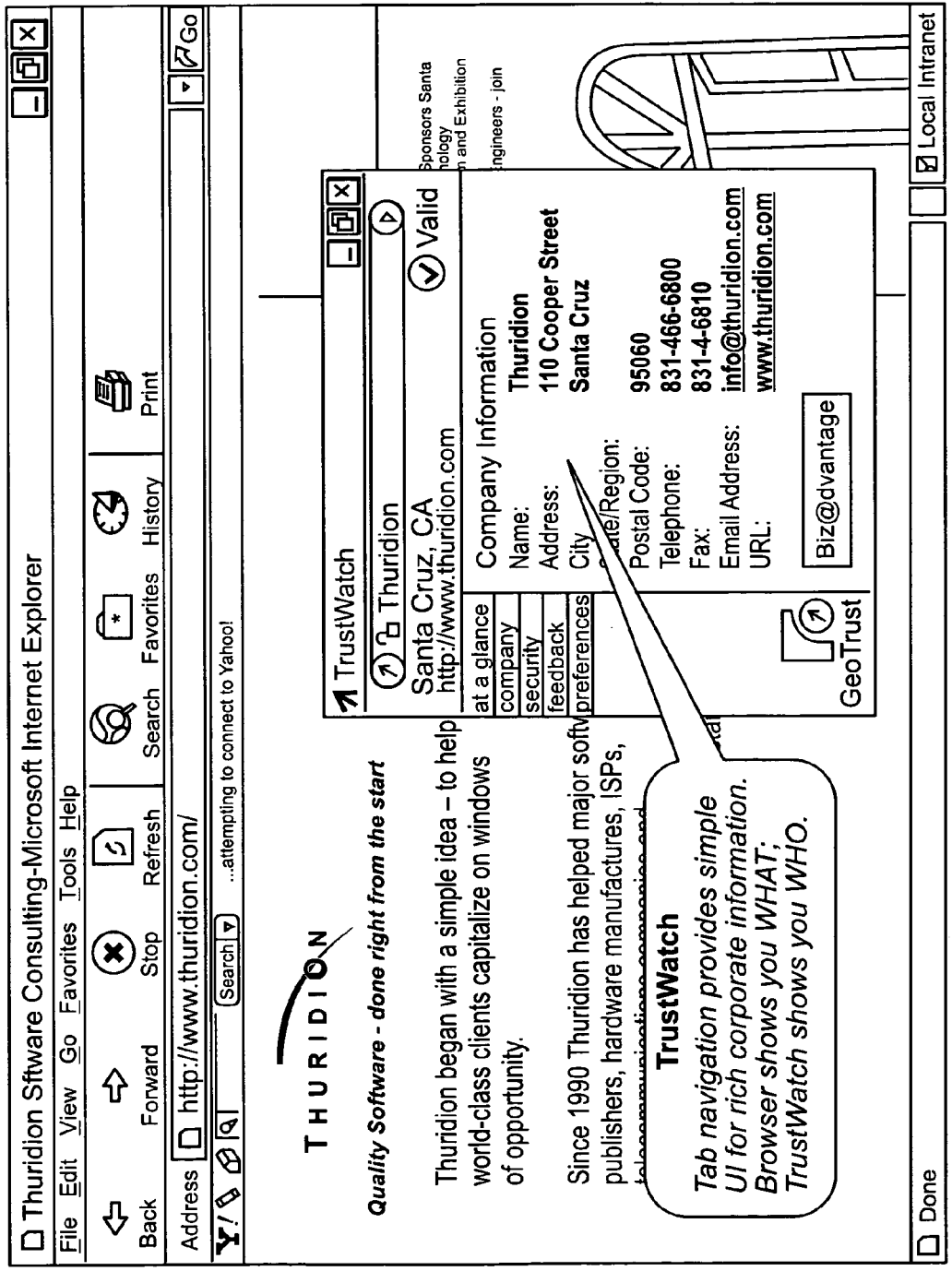
FIG. 9 depicts an exemplary information window that can be activated by clicking on the Gizmo feature of the present invention.

FIG. 8 shows an exemplary Web page having a visual identity display, referred to here as a TrustWatch Gizmo. The Gizmo is a visual signal confirming the identity of the owner of the Web page being viewed. In addition, the Gizmo can include in depth information about the owner. Turning to FIG. 9 there is shown an exemplary Gizmo information window that can be activated by clicking on the Gizmo displayed in FIG. 10. The window can include information regarding the site owner as well as links to further information about the owner. In the exemplary version displayed on FIG. 9, there is displayed a window having five buttons listed as; at a glance, company, security, feedback and performance. By selecting any of the buttons, different information will be displayed in the main window. In the exemplary version, there is shown, Company Information which includes; Name, Address, City State/Region, Postal Code, Telephone, Fax, E-Mail, URL and Links to further information. Additionally, by clicking on one of the other buttons further information will be made available, including details contained in the SSL certificate (if any), information about seals that reside on the Web site, financial data such as credit ratings, credit and payment terms, return policies, ratings by other trading partners and others, the site's privacy and other policy statements, means of providing feedback (e.g., company contact information and email hyperlinks to appropriate departments), the Web site's relationship to other Web sites (including sites which referred or transferred the end user to the current site being viewed), credit and trustworthiness metrics and scores, and so on.

Figure 10:
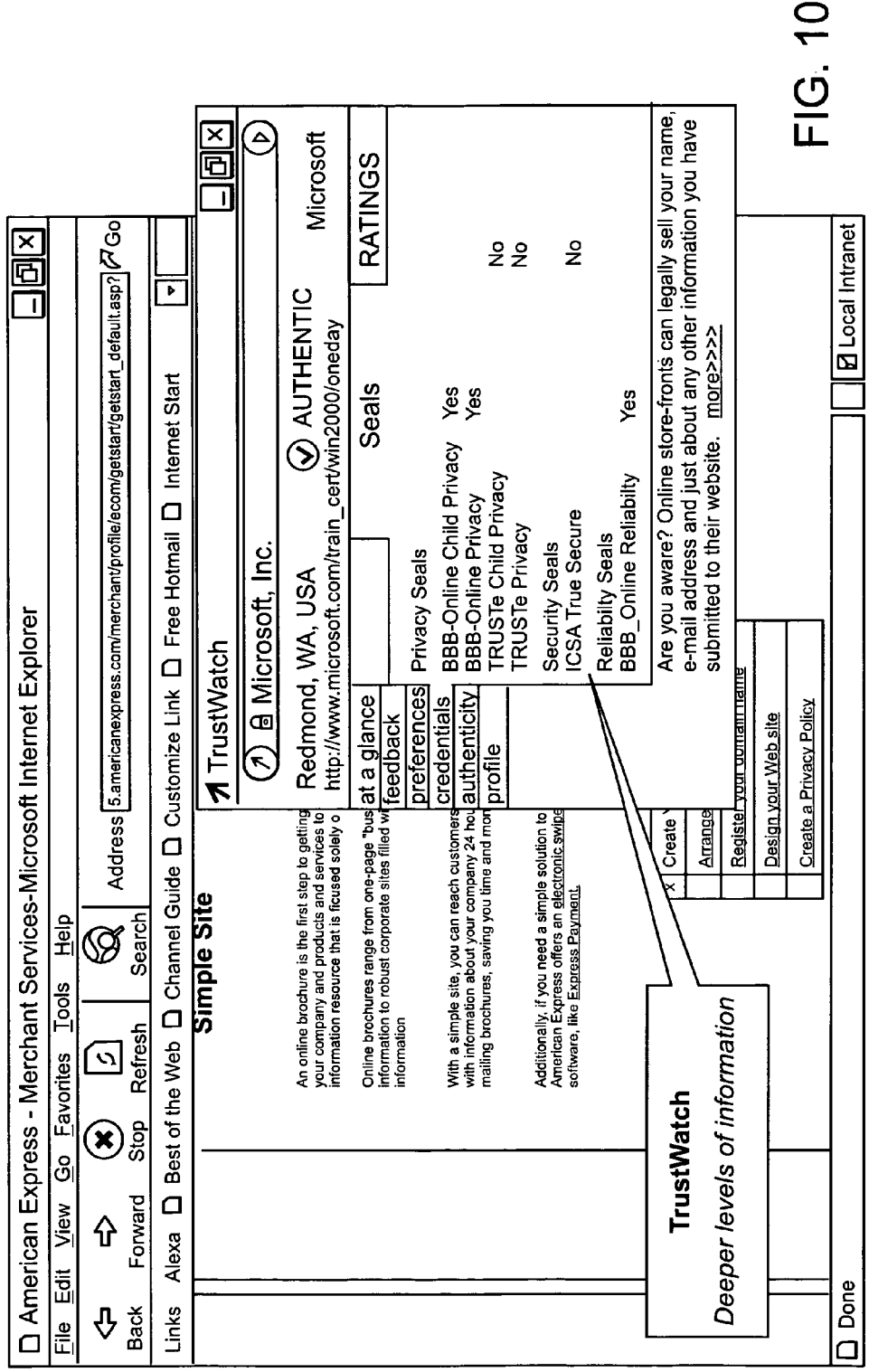
FIG. 10 depicts an embodiment of the Gizmo feature of the present invention further including Credentials information.

Turning now to FIG. 10, there is shown an alternate embodiment of the TrustWatch Gizmo further including Credentials information. In the depicted embodiment, there is shown three different credentials, Privacy Seals, Security Seals and Reliability Seals, that a site owner could display with regard to a site. Of course it would be obvious to one skilled in the art that various types of credentials can be obtained and displayed and that other type of information could also be displayed under this and other headings. The example shown is not meant to be limiting.

In another embodiment the present invention can be implemented to provide real time confirmation of which Web site a viewer is viewing (i.e., no spoofing or high jacking). Additionally, the user can be provided with confirmation of the registrant of the domain name and information about the business which owns or is behind the site. The business information could in one embodiment be provided and verified through a variety of independent sources.

1. Domain Name Registrant Confirmation

In order to implement this function, enrollment and registration data as is collected as previously described, with the addition of extra fields (as described below). In addition, automatic checking of the domain name registrant against the appropriate registry, such as WHOIS, can be included.

2. Unverified Business Information

The expanded page of True Site can also include unverified business information taken straight from the on-line enrollment form (no editing). This could also include a text field containing additional information, such as an explanation of the relationship between the "real" business and the site and/or domain name registrant shown in the upper part of True Site.

Information fields would be provided by the business/enrollee as noted as being valid on a particular date. In addition such information would not be independently verified against public records.

The verification of domain name registrant and posting of enrollee business data could then be posted almost immediately on the enrollees site, and begin offering useful information immediately. Operations will not slow the process, and there will be little chance of error.

3. Verified Business Information

In an another embodiment of the above process, a standard verification processes for certain data fields in the enrollment form received from the enrollee—chiefly corporate name, official address, state of incorporation, registration number, officers, and renewal date could be undertaken. The True Site display could then be altered to indicate which fields had been independently confirmed. For example, a sentence could be added to the expanded True Site page, as follows "Data fields that have been independently confirmed are marked with an asterisk (*) and the date the data was confirmed." If nothing can be confirmed we no asterisk is shown.

Here is an example of how True Site might look under these rules. First, here it is immediately after enrollment:

The True Site icon:

```
        www.acme.com
  10:08 am GMT 04 Aug 2001
            -----
Trust Provider, Inc.
                    Click Here
```

The expanded icon:

✓ Web site identity confirmed

All data shown in this section was independently confirmed by Trust Provider as of 3:54 pm GMT 02 Aug 2001:

Domain name: www.acme.com

Domain name registrant:

Acme eCommerce
123 Drive
Chicago, IL 60606 USA

Administrative contact: (John Doe jdoe@acme.com)

Registration expires: 25 Jul 2002

Additional business information

The additional business information in this section was provided by jdoe@acme.com at 12:26 pm GMT on 01 Aug 2001 and has *not* been independently verified by Trust Provider:

Acme, Inc.
Illinois corporation      Registration No. abc 123
Incorporated: 1926
Regis. expires: 26 Mar 2001

123 Drive
Chicago, IL 60606 USA

Telephone: +1.555.555.8732 (General information)

President: Name
Secretary: Name

Registered Agent: Name, Law Firm, Attorneys at Law, X Street, Chicago, IL 60601

"Acme eCommerce is a wholly owned subsidiary of Acme, Inc. and manages Acme's on-line system."

Your use of this True Site information is governed by these terms and conditions. For more information on True Site and the data displayed, click here.

Later, after we have checked on-line with the Illinois Secretary of State, the expanded icon will appear as follows:

✓Web site identity confirmed

All data shown in this section was independently confirmed by Trust Provider as of 3:54 pm GMT 02 Aug 2001:

Domain name: www.acme.com

Domain name registrant:

✓Acme eCommerce, Inc.
✓123 Drive
✓Chicago, IL 60606 USA

✓Administrative contact: (John Doe <u>jdoe@acme.com</u>)

✓Registration expires: 25 Jul 2002

Additional business information

The additional business information in this section was provided by jdoe@acme.com at 12:26 pm GMT on 01 Aug 2001. Data that was independently confirmed by Trust Provider as of 1:37 pm GMT 15 Aug 2001 is marked with a checkmark (✓); none of the other data has been independently confirmed:

✓Acme, Inc.
✓Illinois corporation ✓Registration No. abc 123
 Incorporated: 1926
✓Regis. expires: 26 Mar 2001

✓123 Drive
✓Chicago, IL 60606 USA

Telephone: +1.312.555.8732 (General information)

✓President: Name
✓Secretary: Name

✓Registered Agent: Name, Law Firm, Attorneys at Law, 105 State Street, Chicago, IL 60601

"Acme eCommerce is a wholly owned subsidiary of Acme, Inc. and manages Acme's on-line system."

Your use of this True Site information is governed by these <u>terms and conditions</u>. For more information on True Site and the data displayed, <u>click here.</u>

Note that not all information in the display above has a checkmark showing confirmation; nevertheless it is useful. The text field at the end (unconfirmed) is the way a business can explain its relationship to the domain name owner and the domain name itself.

The reason this would work is that the Trust Provider controls the content in a business' True Site on its own computer, so can update these fields and display (including confirmation of fields) whenever it wants to.

The graphics above are just a suggestion—maybe instead confirmed fields get special shading or background. Again, when in doubt, no confirmation would be provided.

Once this kind of True Site is established, it can be expanded over time with more and more tabs and fields with "Trust Provider confirmed" data.

Logical Architecture

The techniques described here are not limited to any particular hardware or software configuration; they may find applicability in any computing or processing environment. For example, functions described as being performed by a server can be distributed across different platforms. Moreover, the techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Thus, the foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing a user with confirmation of identification information for a Web site comprising:
   registering a Web site with an third party;
   saving said registration on a registration server;
   entering in a database an Internet domain for said Web site;
   cross-referencing said Web site's Internet domain to the identification information;
   retrieving said Web site's Internet domain with an Internet browser;
   browsing to the Web site for the Internet domain;
   sending a query from a client application tool via a secure SSL connection to said registration server, the query including said Web site's Internet domain name;
   determining if said Web site's Internet domain has been registered;
   and returning the associated registration data to the client application tool for display on a client display outside of the web browser environment.

2. A method for providing a user with confirmation of identification information for a Web site comprising:
   registering a Web site with an $3^{rd}$ party;
   saving said registration on a registration server;
   entering in a database an Internet domain for said Web site;
   cross-referencing said Web site's Internet domain to the identification information;
   retrieving said Web site's Internet domain with an Internet browser;
   browsing to the Web site and receiving an HTML image tag, calling a program via a secure SSL connection on said registration server providing said Web site's Internet domain name;
   determining if said Web site's Internet domain has been registered;
   and returning an image to the browser for display containing registration data from the registration server associated with the domain name, and date-and-time information and code that prevents the dynamic icon from being copied.

3. A system for providing a user with confirmation of identification information for a Web site comprising:
   a component for registering a Web site with an third party;
   a component for saving said registration on a registration server, including the identification information;
   a component for entering in a database an Internet domain for said Web site;
   a component for cross-referencing said Web site's Internet domain to the identification information;
   a component for retrieving said Web site's Internet domain with an Internet browser; a component for browsing to the Web site for the Internet domain;
   a component for sending a query from a client application tool via a secure SSL connection to said registration server, the query including said Web site's Internet domain name;
   a component for determining if said Web site's Internet domain has been registered;
   and a component for returning the associated registration data to the client application tool for display on a client display outside of the web browser environment.

4. A system for providing a user with confirmation of identification information for a Web site comprising:
   a component for registering a Web site with an $3^{rd}$ party;
   a component for saving said registration on a registration server;
   a component for entering in a database an Internet domain for said Web site; a component for cross-referencing said Web site's Internet domain to the identification information;

a component for retrieving said Web site's Internet domain with an Internet browser;
a component for browsing to the Web site and receiving an HTML image tag; a component for calling a program via a secure SSL connection on said registration server providing said Web site's Internet domain name;
a component for determining if said Web site's Internet domain has been registered;
and a component for returning an image to the browser for display containing registration data from the registration server associated with the domain name, and date-and-time information and code that prevents the dynamic icon from being copied.

5. A method comprising:
browsing to a Web site for an Internet domain;
sending a query from a client application tool to a registration server including providing the Web site's Internet domain name, the registration server having identification information related to the Web site; and responsive to the query, the client application receiving identification information associated with the Web site from the registration server; and the client application displaying the information on a client display outside of the web browser environment.

6. A method comprising:
storing, by a registration server, identification information for an Internet domain for a Web site;
responsive to a communication from a client application, the registration server determining the registration information associated with the Web site's Internet domain name;
and returning an icon to the browser for display containing registration data associated with the domain name from the registration server, the icon being provided along with date-and-time information that prevents the icon from being copied.

7. A method comprising:
saving identification information associated with an Internet domain for a Web site on a registration server;
cross-referencing the Web site's Internet domain to the identification information;
responsive to a query from a client application tool with the Web site's Internet domain name, determining if the Web site's Internet domain has been registered;
and returning the identification information to the client application tool for display on a client display outside of the web browser environment.

8. A method comprising:
a client web browser browsing to a Web site having an Internet domain name;
a client application tool calling a program on a remote registration server and providing the Web site's Internet domain name in order to request identification information related to the Web site and previously stored on the registration server;
and the client receiving an icon for display if the registration server indicates that the Web site's Internet domain has been registered and including date-and-time information that prevents the icon from being copied.

* * * * *